(12) United States Patent
Schwenk

(10) Patent No.: US 7,606,369 B1
(45) Date of Patent: Oct. 20, 2009

(54) PROCESS FOR ESTABLISHING A COMMON CRYPTOGRAPHIC KEY FOR N SUBSCRIBERS

(75) Inventor: Joerg Schwenk, Dieburg (DE)

(73) Assignee: Deutsche Telekom AG, Bonn (DE)

( * ) Notice: Subject to any disclaimer, the term of this patent is extended or adjusted under 35 U.S.C. 154(b) by 0 days.

(21) Appl. No.: 09/807,181

(22) PCT Filed: Sep. 22, 1999

(86) PCT No.: PCT/EP99/07051

§ 371 (c)(1),
(2), (4) Date: Jun. 15, 2001

(87) PCT Pub. No.: WO00/22775

PCT Pub. Date: Apr. 20, 2000

(30) Foreign Application Priority Data

Oct. 9, 1998 (DE) ................. 198 47 941

(51) Int. Cl.
*H04L 9/08* (2006.01)

(52) U.S. Cl. ............ 380/278; 380/277; 380/28; 380/29; 380/262; 380/283; 713/171; 726/9; 726/20; 705/64; 705/65

(58) Field of Classification Search ............ 380/278, 380/45, 277, 28, 29, 283, 262; 713/171; 726/9, 20; 705/64–65
See application file for complete search history.

(56) References Cited

U.S. PATENT DOCUMENTS

| | | |
|---|---|---|
| 4,309,569 A | 1/1982 | Merkle |
| 4,661,658 A | 4/1987 | Matyas |
| 5,315,658 A * | 5/1994 | Micali .................. 380/286 |
| 5,592,552 A * | 1/1997 | Fiat ..................... 713/163 |
| 6,041,122 A * | 3/2000 | Graunke et al. ........... 713/168 |
| 6,049,878 A * | 4/2000 | Caronni et al. ........... 713/201 |
| 6,222,923 B1 * | 4/2001 | Schwenk ................. 380/44 |

FOREIGN PATENT DOCUMENTS

| | | |
|---|---|---|
| DE | 195 11 298 | 10/1996 |
| DE | 195 38 385 | 4/1997 |
| DE | 196 49 292 | 6/1998 |
| EP | 0 314 292 | 5/1989 |
| EP | 0 768 773 | 4/1997 |

OTHER PUBLICATIONS

David A. McGrew, et al., "Key Establishment in Large Dynamic Groups Using One-Way Function Trees", May 20, 1998, pp. 1-13, http://www.cs.umbc.edu/~Sherman/Paper.itse.ps.

Michael Burmester, et al., "A Secure and Efficient Conference Key Distribution System", Proc. of EUROCRYPT'94, Springer—Verlag, Germany, May 9-12, 1994, pp. 275-286.

(Continued)

*Primary Examiner*—Thanhnga B Truong
(74) *Attorney, Agent, or Firm*—Kenyon & Kenyon LLP

(57) ABSTRACT

A process is described which can be used to generate a cryptographic key for a group of subscribers whose number is subject to change. The process can further provide that even after the group key has been established, subscribers can be removed from or added to the key directory without great effort.

3 Claims, 3 Drawing Sheets

OTHER PUBLICATIONS

Michael Steiner, et al., "CLIQUES: A New Approach to Group Key Agreement", Proceedings of 18$^{th}$ International Conference on Distributed Computing Systems, Netherlands, May 26-29, 1998, pp. 380-387.

Michael Steiner, et al., "Diffie-Hellman Key Distribution Extended to Group Communication", Mar. 14-16, 1996, Proceedings of 3$^{rd}$ ACM Conference on Computer and Communications Security, India, pp. 31-37.

JP Patent Abstracts of Japan: JP 05327748 (re Abstract and Fig 1).

* cited by examiner

PROCESS FOR ESTABLISHING A COMMON CRYPTOGRAPHIC KEY FOR N SUBSCRIBERS

FIELD OF THE INVENTION

The process according to the present invention is used to generate and establish a common cryptographic key for n subscribers in order to guarantee the secrecy of messages which are to be transmitted exclusively to the n subscribers via insecure communication channels.

BACKGROUND INFORMATION

The mechanisms of encryption and authentication are used to protect the confidentiality and integrity of communication between two or more persons. However, such mechanisms require the existence of shared information at all subscribers. This shared information is referred to as a cryptographic key.

A conventional process for establishing a common key via insecure communication channels is the process of Diffie and Hellman (DH process; see W. Diffie and M. Hellman, *New Directions in Cryptography*, IEEE Transactions on Information Theory, IT-22(6):644-654, November 1976). The basis of the Diffie-Hellmann key exchange (DH76) is the fact that it is virtually impossible to calculate logarithms modulo a large prime number p. This fact is utilized by Alice and Bob in the example shown below, in that they each secretly choose a number x and y, respectively, smaller than p (and relatively prime to p-1). They then send each other (consecutively or simultaneously) the x-th (and y-th) power of a publicly known number $\alpha$. From the received powers, they are able to calculate a common key $K:=\alpha^{xy}$ by renewed raising to the power with x and y, respectively. An attacker who sees only $\alpha^x$ and $\alpha^y$ is unable to calculate K therefrom. (The only presently known method of doing so would involve first calculating the logarithm, e.g., of $\alpha^x$ to the base $\alpha$ modulo p, and then raising $\alpha^y$ to that power.)

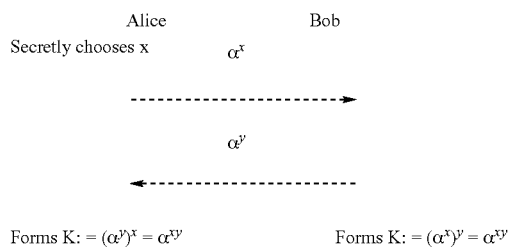

Example of Diffie-Hellmann Key Exchange

The problem with the DH key exchange described in the example is that Alice does not know whether she is actually communicating with Bob or with an impostor. In IPSec, this problem is solved by the use of public key certificates in which the identity of a subscriber is linked to a public key by a trustworthy authority. The identity of a conversation partner is thereby verifiable.

DH key exchange can also be implemented using other mathematical structures, e.g., using finite bodies GF(2n) or elliptic curves. Such alternatives make it possible to improve performance. However, this process is only suitable for agreeing upon a key between two subscribers.

Various attempts have been made to extend the DH process to three or more subscribers (DH groups). (An overview of the state of the art is given by M. Steiner, G. Tsudik, M. Waidner, *Diffie-Hellman Key Distribution Extended to Group Communication*, Proc. 3rd ACM Conference on Computer and Communications Security, March 1996, New Delhi, India.)

An extension of the DH process to three subscribers A, B and C is described, for example, by the following table. (Calculation in each case mod p):

|  | A → B | B → C | C → A |
|---|---|---|---|
| 1st round | $g^a$ | $g^b$ | $g^c$ |
| 2nd round | $g^{ca}$ | $g^{ab}$ | $g^{bc}$ |

After carrying out these two rounds, each of the three subscribers is able to calculate the secret key $g^{abc}$ mod p.

In all these extensions, at least one of the following three problems occurs:

The subscribers must be arranged in a certain manner, for instance in a circle in the above example.

The subscribers have no influence vis-à-vis the central station on the choice of key.

The number of rounds is dependent on the number of subscribers.

A further process for the common establishment of a key is described in German Patent Application No. 195 38 385.0. In this process, however, the central station must know the secret keys of the subscribers.

In the IEEE Transaction On Software Engineering, an article dated May 20, 1998, pages 1 through 13, entitled *"Key Establishment in Large Dynamic Groups Using One-Way Function Trees"* by David A. McGrew and Alan T. Sherman, introduces a process for establishing a common cryptographic key. This process is based on a tree structure. In that case, a group manager manages a binary tree, each node x of it being linked to two cryptographic keys, a node key kx and a hidden node key k'x≈g(k$_x$). The hidden node key is calculated from the node key with the aid of a one-way function. Each subscriber knows the unhidden node keys on the path from his/her node up to the root and the hidden node keys for the nodes which are siblings for his/her path to the root, and otherwise no other hidden or unhidden keys. The feasibility of this process is based on the fact that the group manager knows all the leaf keys.

Burmester, Desmedt, *A secure and efficient conference key distribution system*, Proc. EUROCRYPT'94, Springer LNCS, Berlin 1994 describes a design in which two rounds are required to generate the key, it being necessary in the second round for the central station to send n messages of length p=approx. 1000 bits for n subscribers.

Another conventional cryptographic process is referred to as the (n,t) threshold process. With an (n,t) threshold process, it is possible to break a key k down into t parts (called shadows), such that said key k can be reconstructed from any n of the t shadows (see Beutelspacher, Schwenk, Wolfenstetter: *Moderne Verfahren der Kryptographie* (2nd edition), Vieweg Verlag, Wiesbaden 1998).

SUMMARY OF THE INVENTION

The present invention can provide the establishment of a common group key between a central station and a group of n subscribers. The present invention can also provide that, even after the group key has been established, subscribers can be removed from or added to the key directory without great effort.

In accordance with the present invention, a process is provided in which a group key is established with the aid of a tree structure. To that end, the number of subscribers n involved in the key agreement is represented as a binary tree having n leaves. For each natural number n, there are one or more representations of this type. The number of leaves is identical with the number of subscribers included in the process. This means that a number of n leaves of a binary tree of depth $\lceil \log_2 n \rceil$ is allocated to a number of n subscribers.

DETAILED DESCRIPTION

Figure 1:
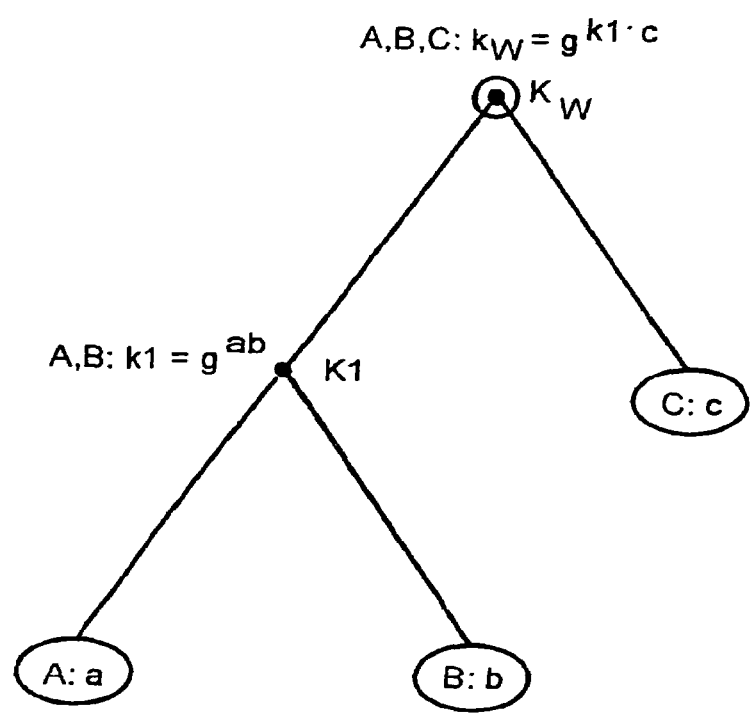
FIG. 1 shows a tree structure for three subscribers according to an embodiment of the present invention.

FIG. 1 shows the operating principle of the process according to the present invention with reference to the tree structure of a key agreement for three subscribers A, B, C.

In order to establish a common key, subscribers A, B and C proceed as follows:

Subscribers A and B carry out a DH process with randomly generated numbers a and b. They obtain the common key $k1=g^{ab}$ mod p, which is allocated to the common node K1.

Subscribers A and B on the one side, and subscriber C on the other side carry out a second DH process which is based on common key k1 of subscribers A and B and on a randomly generated number c of subscriber C. The result is common key $k=g^{k1 \cdot c}$ mod p, which is allocated to the root of tree $K_W$.

Figure 2:
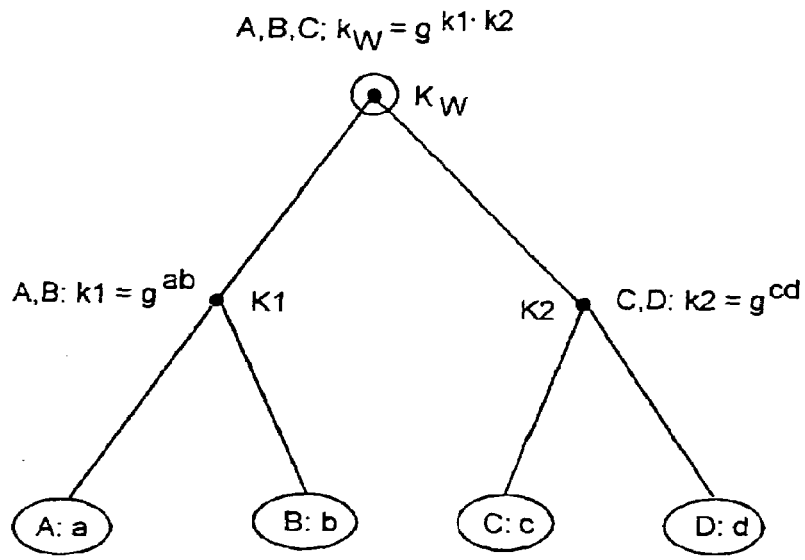
FIG. 2 shows a tree structure for a key agreement for four subscribers A, B, C and D according to an embodiment of the present invention.

In the following, an example of a key agreement for four subscribers A, B, C and D is described with reference to FIG. 2:

In order to establish a common key for four subscribers (FIG. 2), subscribers A, B, C and D proceed as follows:

Subscribers A and B carry out a DH process with randomly generated numbers a and b. They obtain the common key $k1=g^{ab}$ mod p.

Subscribers C and D carry out a DH process with randomly selected numbers c and d. They obtain the common key $k2=g^{cd}$ mod p.

Subscribers A and B on the one side, and subscribers C and D on the other side jointly carry out a second DH process in which subscribers A and B include key k1 and subscribers C and D include key k2. The result is common key $k_w=g^{k1 \cdot k2}$ mod p, which is allocated to the root of tree $K_w$.

Figure 3:
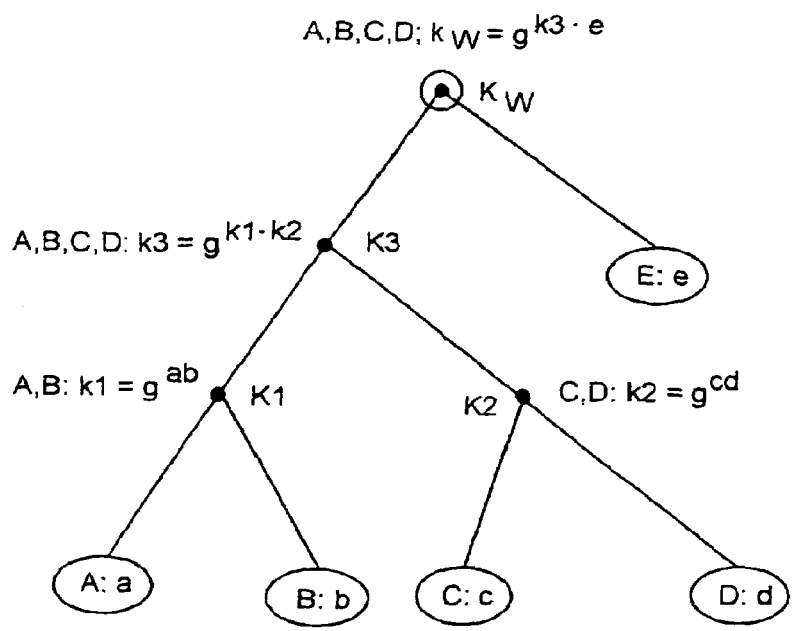
FIG. 3 shows a tree structure of a key agreement for five subscribers A, B, C, D and E according to an embodiment of the present invention.

In the following, an example of a key agreement for five subscribers A, B, C, D and E is described with reference to FIG. 3:

In order to establish a common key, subscribers A, B, C, D and E proceed as follows:

Subscribers A and B carry out a DH process with randomly selected numbers a and b. They obtain the common key $k1=g^{ab}$ mod p.

Subscribers C and D carry out a DH process with randomly selected numbers c and d. They obtain the common key $k2=g^{cd}$ mod p.

Subscribers A and B on the one side, and subscribers C and D on the other side jointly carry out a second DH process in which subscribers A and B include the common key k1 and subscribers C and D include the common key K2. The result is a common key $k3=g^{k1 \cdot k2}$ mod p for subscribers A, B, C and D.

Subscribers A, B, C and D on the one side, and subscriber E on the other side carry out a third DH process in which common key k3 of subscribers A, B, C and D and a random number e generated for subscriber E are included. The result is common key $k_w=g^{k3 \cdot e}$ mod p, which is allocated to the root of the tree $K_w$.

Owing to the structure of the process according to the present invention, it is possible to include new subscribers or to exclude individual subscribers without having to carry out the entire process again for each subscriber.

Figure 4:
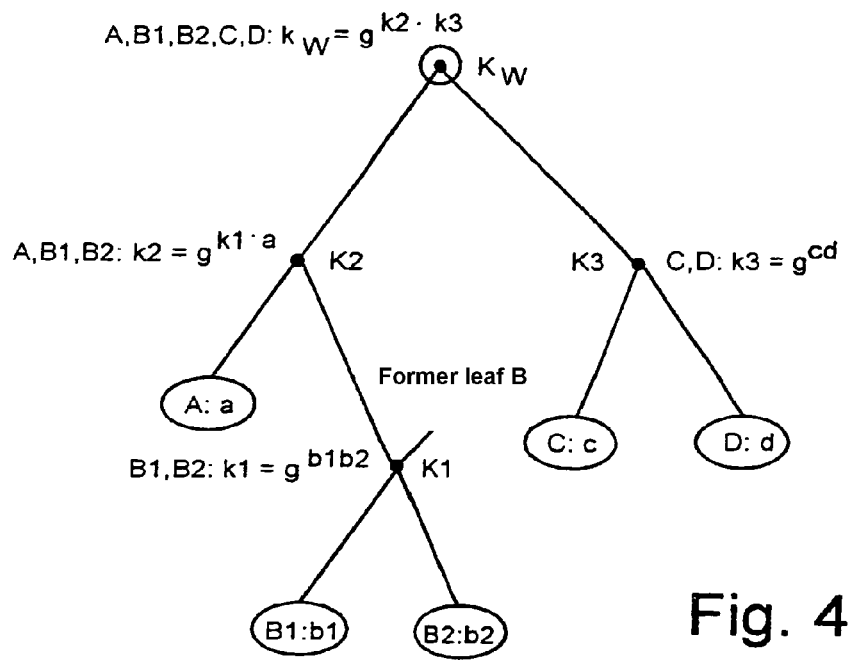
FIG. 4 shows extending the tree structure by one subscriber for a further embodiment of the present invention according to FIG. 2.

The addition of a new subscriber is explained in greater detail with reference to a tree structure having four subscribers according to FIG. 4. The starting situation is a tree structure according to FIG. 2, to which a new subscriber is to be added at leaf B.

When a new subscriber is added to an already existing tree structure which possesses a common secret, in order to establish a new common key for n+1 subscribers, two new leaves B1 and B2 are added at a suitable location of the binary tree (leaf B given). The new tree then has n+1 leaves and is of depth $\lceil \log_2(n+1) \rceil$. The subscriber previously assigned to leaf B is assigned to one of the new leaves B1. The new subscriber is assigned to the other leaf B2 still free. The previous leaf B becomes a node K1 for leaves B1 and B2. Starting from new leaves B1 and B2, new secrets are established as far as the root of the tree only in those nodes K which lie within the framework of the tree structure on the path from new leaves B1 and B2 to the root of the tree $K_w$. In this specific case, they are nodes K1, K2 and $K_w$.

If the number of subscribers is a power of two, the depth of the tree is increased through this operation by 1 (see previous example). If the number of subscribers is not a power of two, then, through skillful selection of the leaf to be divided, it is possible to avoid an increase of the depth, as shown by the following example:

In order, for example, to add a fourth subscriber to three subscribers, one proceeds as follows (starting from the situation according to FIG. 1):

Subscriber C carries out a DH process with newly added subscriber D using randomly generated numbers c' and d (c' should differ from the previously selected c, but this need not be the case). The result is $k2'=g^{c'd}$ mod p.

Subscriber A and subscriber B on the one side, and subscribers C and D on the other side carry out a DH process using the values k1 and k2'. The result is $k=g^{k1 \cdot k2'}$ mod p.

With such a configuration, subscribers A and B need not carry out a new key exchange. Generally, it is only necessary to newly agree upon the secrets which lie in the associated tree on the path from the leaf of the new subscriber to root $K_w$.

The exclusion or deletion of a subscriber is explained in greater detail with reference to a tree structure having four subscribers according to FIG. 5. The starting situation is a tree structure according to FIG. 2, from which subscriber B is to be removed.

Figure 5:
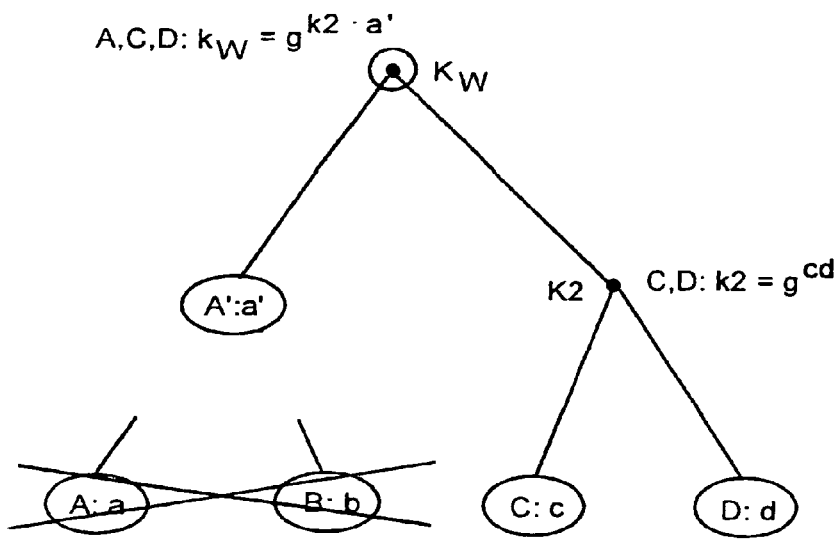
FIG. 5 shows the removal/deletion of a subscriber from the tree structure for a further embodiment of the present invention according to FIG. 2.

When a subscriber B is excluded or deleted from an already existing tree structure which has a common secret, then, as indicated in FIG. 5, both the leaf of subscriber B who is to be removed and the leaf of subscriber A, assigned to the same common node K1, are removed. Common node K1 becomes new leaf A' of subscriber A remaining in the tree structure. Starting from the leaves of the tree and going as far as root $K_w$, new secrets are established only in those nodes K which are directly affected by new leaf A' within the framework of the tree structure in the direction of root $K_w$. In this specific case, this is only root node $K_w$. Given such a configuration, subscribers C and D need not carry out a new key exchange. Generally, in this case it is also only necessary to newly agree upon those secrets which lie in the associated tree on the path from the leaf of the partner of the removed subscriber to the root.

The process can be further developed in many ways: For example, it is possible to use other groups for forming the discrete exponential function $x \to g^x$.

When a subscriber is added or removed, it is possible, for example, to agree not to use the old secrets, but rather the result of a (possibly randomized) one-way function for the required new implementations of the DH process.

The invention claimed is:

1. A process for secret transmission of a message by establishing a common cryptographic key for n subscribers using the Diffie-Hellman process, as recited in comprising:
    assigning the n subscribers respective leaves of a binary-structured tree which has a root, n leaves, is of depth [log 2n] and has tree nodes;
    for each one of the n subscribers, generating a respective secret, the respective secret being assigned to each one of the n leaves to which the one of the n subscribers is assigned; and
    establishing secrets consecutively in a direction of the root of said tree for all k nodes of said tree starting from the n leaves of said tree across an entire hierarchy of said tree, wherein two already known secrets are combined using the Diffie-Hellman process to form a new common secret, the new common secret being allocated to a common node so that the common cryptographic key for all n subscribers is allocated to a last one of tree nodes, the last one of the tree nodes being the root of said tree;
    adding a new subscriber to the n subscribers of said tree so that there are n+1 subscribers of said tree, the adding step including:
        adding two new leaves as successors to a selected one of the n leaves of said tree so that a new binary-structure tree has n+1 leaves and is of depth [log 2(n+1)];
        assigning the one of the n subscribers to whom the selected one of the n leaves is assigned one of the two new leaves and assigning the new subscriber to another one of the two new leaves, the selected one of the n leaves becoming the common node for the two new leaves; and
        starting from the new leaves in the direction of the root of said tree, establishing new secrets only in those of the tree nodes which lie within a framework of said tree on a path from the two new leaves to the root of said tree.

2. A method of transmitting a message to a location, comprising:
    establishing a common cryptographic key for n subscribers using Diffie-Hellman process;
    encrypting the message with the common cryptographic key;
    transmitting the encrypted message to the location,
    wherein, the establishing the common cryptographic key includes:
    assigning the n subscribers respective leaves of a binary-structured tree which has a root, n leaves, is of depth [log 2n] and has tree nodes;
    for each one of the n subscribers, generating a respective secret, the respective secret being assigned to each one of the n leaves to which the one of the n subscribers is assigned; and
    establishing secrets consecutively in a direction of the root of said tree for all k nodes of said tree starting from the n leaves of said tree across an entire hierarchy of said tree, wherein two already known secrets are combined using the Diffie-Hellman process to form a new common secret, the new common secret being allocated to a common node so that the common cryptographic key for all n subscribers is allocated to a last one of tree nodes, the last one of the tree nodes being the root of said tree;
    adding a new subscriber to the n subscribers of said tree so that there are n+1 subscribers of said tree, the adding step including:
        adding two new leaves as successors to a selected one of the n leaves of said tree so that a new binary-structure tree has n+1 leaves and is of depth [log 2(n+1)];
        assigning the one of the n subscribers to whom the selected one of the n leaves is assigned one of the two new leaves and assigning the new subscriber to another one of the two new leaves, the selected one of the n leaves becoming the common node for the two new leaves; and
        starting from the new leaves in the direction of the root of said tree, establishing new secrets only in those of the tree nodes which lie within a framework of said tree on a path from the two new leaves to the root of said tree.

3. The method as recited in claim 2, further comprising:
    excluding a selected one of the n subscribers from said tree, the excluding steps including:
        removing a first one of the n leaves of said tree to which the selected one of the n subscribers is assigned;
        removing a second one of the n leaves, the second one of the n leaves sharing a common node with the first one of the n leaves, the common node with the first one of the n leaves becoming a new leaf assigned to the one of the n subscribers to which the second one of the n leaves is assigned; and
        starting from the new leaf of said tree in the direction of the root of said tree, establishing new secrets only in those of the tree nodes which lie within a framework of said tree on a path from the new leaf to the root of said tree.

* * * * *